United States Patent
Zhou

(10) Patent No.: US 10,659,233 B1
(45) Date of Patent: May 19, 2020

(54) AUTHENTICATION BASED ON A RECOVERED PUBLIC KEY

(71) Applicant: Alibaba Group Holding Limited, George Town (KY)

(72) Inventor: Zhiyuan Zhou, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/587,494

(22) Filed: Sep. 30, 2019

Related U.S. Application Data

(63) Continuation of application No. PCT/CN2019/078382, filed on Mar. 15, 2019.

(51) Int. Cl.
*H04L 9/30* (2006.01)
*H04L 9/32* (2006.01)
*H04L 9/06* (2006.01)
*H04L 29/06* (2006.01)
*H04L 9/08* (2006.01)

(52) U.S. Cl.
CPC .......... *H04L 9/3252* (2013.01); *H04L 9/0637* (2013.01); *H04L 9/0894* (2013.01); *H04L 9/3066* (2013.01); *H04L 63/08* (2013.01); *H04L 2209/38* (2013.01)

(58) Field of Classification Search
CPC . H04L 9/3066; H04L 9/3252; H04L 2209/38; H04L 63/08
See application file for complete search history.

(56) References Cited

U.S. PATENT DOCUMENTS

| | | | |
|---|---|---|---|
| 2015/0006900 A1* | 1/2015 | Gallant | H04L 9/3252 713/176 |
| 2015/0287026 A1 | 10/2015 | Yang et al. | |
| 2019/0007219 A1* | 1/2019 | Ghosh | H04L 9/3066 |

FOREIGN PATENT DOCUMENTS

| | | |
|---|---|---|
| CN | 108683646 | 10/2018 |
| CN | 109377198 | 2/2019 |
| WO | WO 2018020370 | 2/2018 |

OTHER PUBLICATIONS

Johnson et al., The Elliptic Curve Digital Signature Algorithm (ECDSA), Certicom Corporation, 2001.*
Bos et al., Elliptic Curve Cryptography in Practice, 2013.*
Shen et al., "SM2 Digital Signature Algorithm," Chinese Academy of Science Internet Engineering Task Force, Feb. 2014, 40 pages.

(Continued)

*Primary Examiner* — Minh Dinh
(74) *Attorney, Agent, or Firm* — Fish & Richardson P.C.

(57) ABSTRACT

This specification relates to the field of computer technologies, and in particular, to a authentication method, and a corresponding apparatus and system. One of the methods includes receiving, by a first node, a signed message from a second node, wherein the signed message includes a digital signature generated by the second node; in response to receiving the signed message, recovering, by the first node, one or more public keys from the digital signature; in response to recovering the one or more public keys, determining, by the first node, that one of the one or more public keys matches a verified public key; and in response to determining that one of the one or more public keys matches the verified public key, determining that the signed message is authentic.

24 Claims, 6 Drawing Sheets

(56) References Cited

OTHER PUBLICATIONS

Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
PCT International Search Report and Written Opinion in International Application No. PCT/CN2019/078382, dated Dec. 18, 2019, 6 pages.

* cited by examiner

AUTHENTICATION BASED ON A RECOVERED PUBLIC KEY

CROSS-REFERENCE TO RELATED APPLICATIONS

This application is a continuation of PCT Application No. PCT/CN2019/078382, filed on Mar. 15, 2019, which is hereby incorporated by reference in its entirety.

TECHNICAL FIELD

This specification relates to the field of computer technologies, and in particular, to an authentication method, and a corresponding apparatus and system.

BACKGROUND

Distributed ledger systems (DLSs), which can also be referred to as consensus networks, and/or blockchain networks, enable participating entities to securely, and immutably store data. DLSs are commonly referred to as blockchain networks without referencing any particular user case. Examples of types of blockchain networks can include public blockchain networks, private blockchain networks, and consortium blockchain networks. A consortium blockchain network is provided for a select group of entities, which control the consensus process, and includes an access control layer.

The Elliptic Curve Cryptosystem (ECC) includes a variant of digital signature algorithms that use elliptic curve cryptography. The ECC algorithms are based on solving elliptic curve discrete logarithm problems, and can be used in generating digital signatures. For example, suppose user A wants to send an encrypted message to user B, user A can first create a private key-public key pair that is calculated by a base point from the elliptic curve whose parameters are pre-agreed on by both user A and user B. Then user A signs the message with her private key, and sends the signed message to user B. Upon the receipt of the signed message, user B can verify the signature by using the public key of user A. If the verification succeeds, user B can confirm that the received message is not tempered during the transmission. The security of the ECC algorithms stems from the difficulty of solving the logarithm problem. Comparing with the Rivest-Shamir-Adleman (RSA) algorithm, the key length of the ECC algorithm is shorter, and the encryption and decryption process are faster and require a smaller calculation storage space. For example, the difficulty of a 210-bit ECC algorithm is comparable to a 2048-bit RSA algorithm.

Issues can be encountered when applying ECC algorithms in blockchain related applications. Each blockchain node may be associated with more than one public key. Therefore, in the previously described example, if node A is associated with more than one public key, to verify a message signed by node A, node B has to try each of node A's public keys, resulting in a longer processing time. What is needed is a technique to bypass these issues in the existing technology.

SUMMARY

This specification describes technologies for authenticating a node associated with a blockchain network. These technologies generally involve recovering a public key from a digital signature sent from an account of a blockchain network node, and authenticating the node by comparing the recovered public key with verified pubic keys.

This specification also provides one or more non-transitory computer-readable storage media coupled to one or more processors and having instructions stored thereon which, when executed by the one or more processors, cause the one or more processors to perform operations in accordance with embodiments of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

It is appreciated that methods in accordance with this specification may include any combination of the aspects and features described herein. That is, methods in accordance with this specification are not limited to the combinations of aspects and features specifically described herein, but also include any combination of the aspects and features provided.

The details of one or more embodiments of this specification are set forth in the accompanying drawings and the description below. Other features and advantages of this specification will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
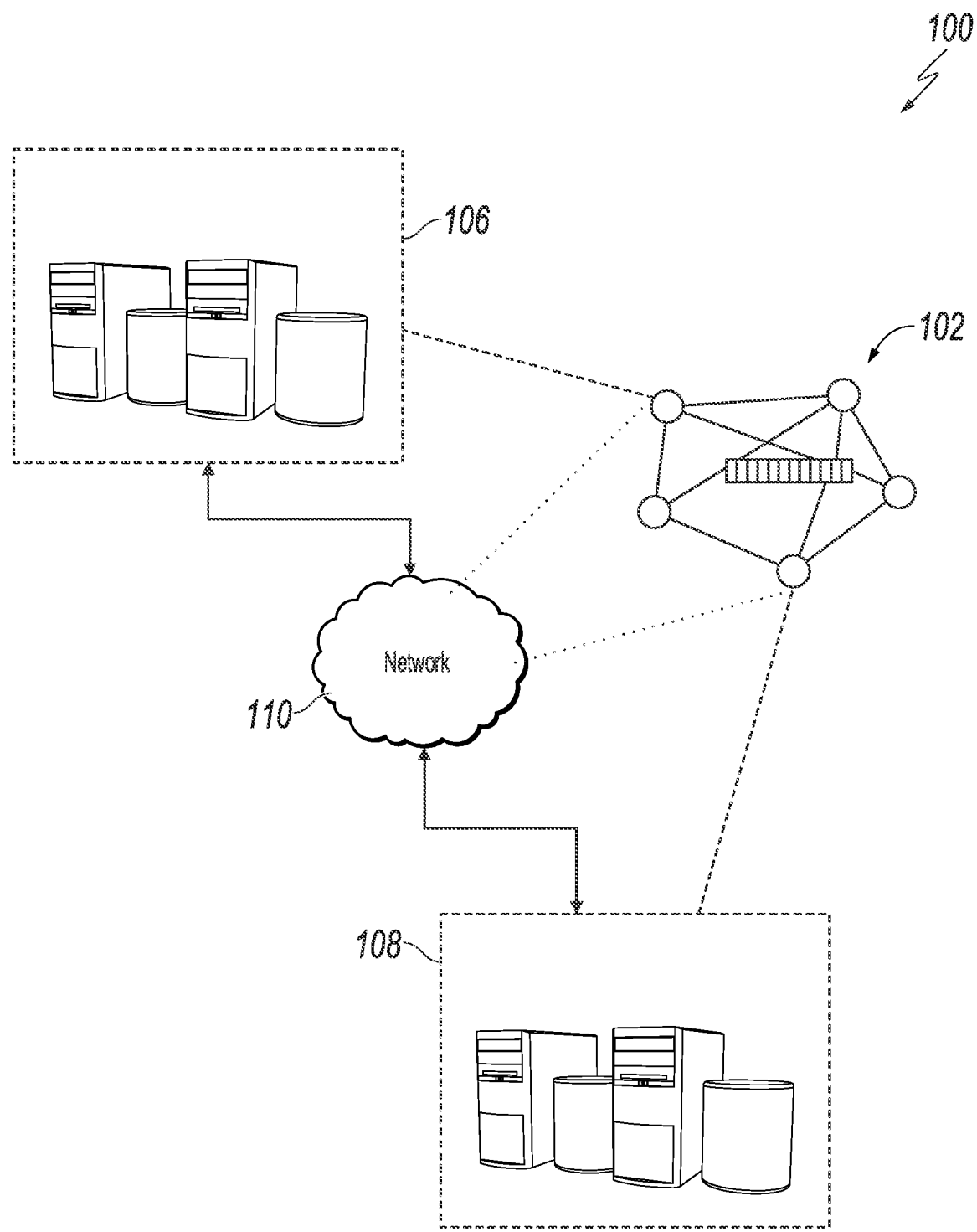
FIG. 1 is a diagram illustrating an example of an environment that can be used to execute embodiments of this specification.

This specification describes technologies for authenticating a node associated with a blockchain network. These technologies generally involve recovering a public key from a digital signature sent from an account of a blockchain network node, and authenticating the node by comparing the recovered public key with verified pubic keys.

To provide further context for embodiments of this specification, and as introduced above, distributed ledger systems (DLSs), which can also be referred to as consensus networks (e.g., made up of peer-to-peer nodes), and blockchain networks, enable participating entities to securely, and immutably conduct transactions, and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, transactions recorded on a blockchain are reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. The transactions, which have already been verified by the nodes of the blockchain network, are hashed and encoded into a Merkle tree. A Merkle tree is a data structure in which data at the leaf nodes of the tree is hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining whether it is consistent with the structure of the tree.

Whereas a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network. Embodiments of this specification are described in further detail herein with reference to a consortium blockchain network. It is contemplated, however, that embodiments of this specification can be realized in any appropriate type of blockchain network.

In general, a consortium blockchain network is private among the participating entities. In a consortium blockchain network, the consensus process is controlled by an authorized set of nodes, which can be referred to as consensus nodes, one or more consensus nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network.

In some examples, within a consortium blockchain network, a global blockchain is provided as a blockchain that is replicated across all nodes. That is, all consensus nodes are in perfect state consensus with respect to the global blockchain. To achieve consensus (e.g., agreement to the addition of a block to a blockchain), a consensus protocol is implemented within the consortium blockchain network. For example, the consortium blockchain network can implement a practical *Byzantine* fault tolerance (PBFT) consensus, described in further detail below.

Implementations of the specification are described in further detail herein with reference to a consortium blockchain network, which is public among the participating entities. It is contemplated, however, that implementations of the specification can be realized in any appropriate type of blockchain network.

Implementations of the specification are described in further detail herein in view of the above context. More particularly, and as introduced above, implementations of the specification are directed to providing a method capable of authenticating a node associated with a blockchain network.

Specifically, in some embodiments, the described techniques recover a public key from a signature sent by a blockchain node, and then use the recovered key to authenticate that node, where the signature is signed using ECC algorithms. Because of the mathematics of ecliptic curve functions, one or more public keys can be recovered from the signature (e.g., one even key, and one odd key). In some cases, more than two keys can be recovered. Therefore, the described techniques further provide an enhanced solution that can determine the correct public key from the signature. In this enhanced solution, a first blockchain node signs a message using its private key generated by ECC algorithms, where the signature includes redundant information that is determined by a point on the elliptic curve on which the ECC algorithm based. Once a second blockchain node receives the signed message, it can recover and determine the correct public key associated with the first blockchain node based on the redundant information included in the signature.

Aside from the above-discussed example, the described techniques can benefit many other applications that make use of the blockchain technology.

FIG. 1 is a diagram illustrating an example of an environment 100 that can be used to execute embodiments of this specification. In some examples, the environment 100 enables entities to participate in a consortium blockchain network 102. The environment 100 includes computing devices 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link. In some examples, the network 110 enables communication with, and within the consortium blockchain network 102. In general the network 110 represents one or more communication networks. In some cases, the computing devices 106, 108 can be nodes of a cloud computing system (not shown), or each computing device 106, 108 can be a separate cloud computing system including a number of computers interconnected by a network and functioning as a distributed processing system.

In the depicted example, the computing systems 106, 108 can each include any appropriate computing system that enables participation as a node in the consortium blockchain network 102. Examples of computing devices include, without limitation, a server, a desktop computer, a laptop computer, a tablet computing device, and a smartphone. In some examples, the computing systems 106, 108 hosts one or more computer-implemented services for interacting with the consortium blockchain network 102. For example, the computing system 106 can host computer-implemented services of a first entity (e.g., user A), such as a transaction management system that the first entity uses to manage its transactions with one or more other entities (e.g., other users). The computing system 108 can host computer-implemented services of a second entity (e.g., user B), such as a transaction management system that the second entity uses to manage its transactions with one or more other entities (e.g., other users). In the example of FIG. 1, the consortium blockchain network 102 is represented as a peer-to-peer network of nodes, and the computing systems 106, 108 provide nodes of the first entity, and second entity respectively, which participate in the consortium blockchain network 102.

Figure 2:
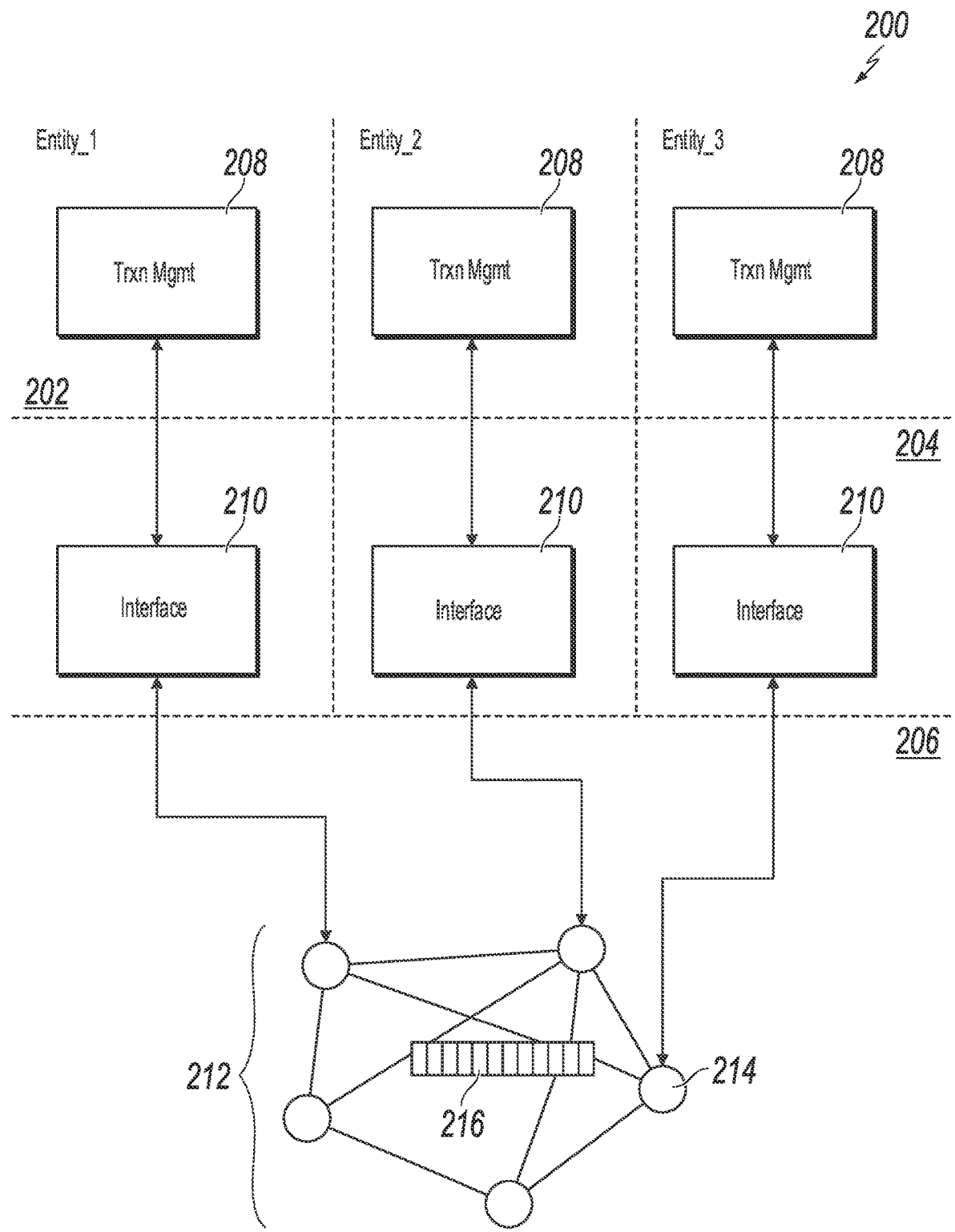
FIG. 2 is a diagram illustrating an example of an architecture in accordance with embodiments of this specification.

FIG. 2 depicts an example of an architecture 200 in accordance with embodiments of this specification. The architecture 200 includes an entity layer 202, a hosted services layer 204, and a blockchain network layer 206. In the depicted example, the entity layer 202 includes three participants, Participant A, Participant B, and Participant C, each participant having a respective transaction management system 208.

In the depicted example, the hosted services layer 204 includes interfaces 210 for each transaction management system 210. In some examples, a respective transaction management system 208 communicates with a respective interface 210 over a network (e.g., the network 110 of FIG. 1) using a protocol (e.g., hypertext transfer protocol secure (HTTPS)). In some examples, each interface 210 provides communication connection between a respective transaction management system 208, and the blockchain network layer 206. More particularly, the interface 210 communicate with a blockchain network 212 of the blockchain network layer 206. In some examples, communication between an interface 210, and the blockchain network layer 206 is conducted using remote procedure calls (RPCs). In some examples, the interfaces 210 "host" blockchain network nodes for the respective transaction management systems 208. For example, the interfaces 210 provide the application programming interface (API) for access to blockchain network 212.

As described herein, the blockchain network 212 is provided as a peer-to-peer network including a plurality of nodes 214 that immutably record information in a blockchain 216. Although a single blockchain 216 is schematically depicted, multiple copies of the blockchain 216 are provided, and are maintained across the blockchain network 212. For example, each node 214 stores a copy of the blockchain. In some embodiments, the blockchain 216 stores information associated with transactions that are performed between two or more entities participating in the consortium blockchain network.

A blockchain (e.g., the blockchain 216 of FIG. 2) is made up of a chain of blocks, each block storing data. Examples of data include transaction data representative of a transaction between two or more participants. While transactions are used herein by way of non-limiting example, it is contemplated that any appropriate data can be stored in a blockchain (e.g., documents, images, videos, audio). Examples of a transaction can include, without limitation, exchanges of something of value (e.g., assets, products, services, currency). The transaction data is immutably stored within the blockchain. That is, the transaction data cannot be changed.

Before storing in a block, the transaction data is hashed. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Further, and as noted above, the hash value is of fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, the consensus node generates a block header, hashes all of the transactions in the block, and combines the hash value in pairs to generate further hash values until a single hash value is provided for all transactions in the block (the Merkle root hash). This hash is added to the block header. The consensus node also determines the hash value of the most recent block in the blockchain (i.e., the last block added to the blockchain). The consensus node also adds a nonce value, and a timestamp to the block header.

In general, PBFT provides a practical *Byzantine* state machine replication that tolerates *Byzantine* faults (e.g., malfunctioning nodes, malicious nodes). This is achieved in PBFT by assuming that faults will occur (e.g., assuming the existence of independent node failures, and/or manipulated messages sent by consensus nodes). In PBFT, the consensus nodes are provided in a sequence that includes a primary consensus node, and backup consensus nodes. The primary consensus node is periodically changed, Transactions are added to the blockchain by all consensus nodes within the blockchain network reaching an agreement as to the world state of the blockchain network. In this process, messages are transmitted between consensus nodes, and each consensus nodes proves that a message is received from a specified peer node, and verifies that the message was not modified during transmission.

In PBFT, the consensus protocol is provided in multiple phases with all consensus nodes beginning in the same state. To begin, a client sends a request to the primary consensus node to invoke a service operation (e.g., execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

In some blockchain networks, cryptography is implemented to maintain privacy of transactions. For example, if two nodes want to keep a transaction private, such that other nodes in the blockchain network cannot discern details of the transaction, the nodes can encrypt the transaction data. An example of cryptography includes, without limitation, symmetric encryption, and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can en-/de-crypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 2, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 2, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

Figure 3:
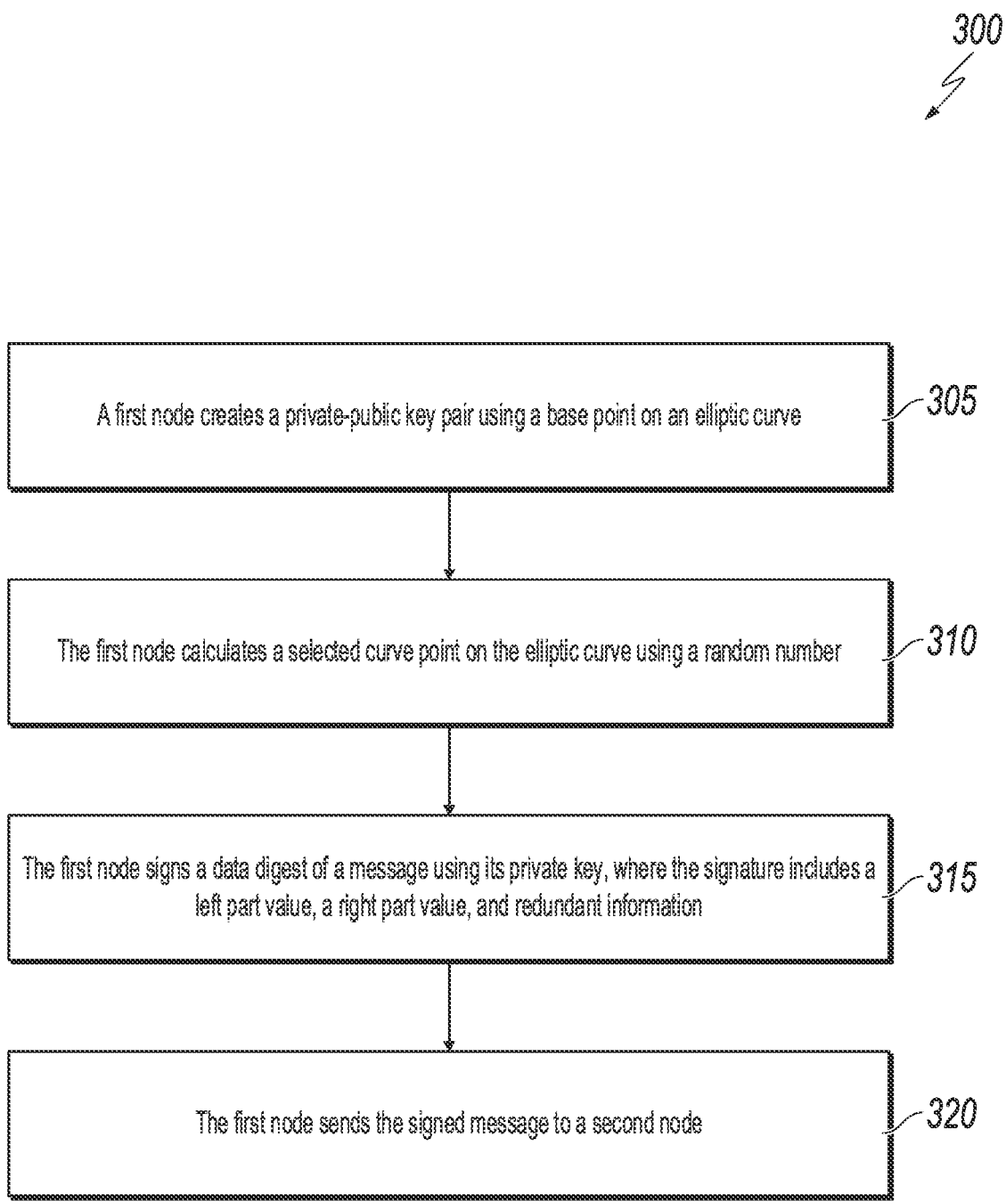
FIG. 3 depicts an example of a process of generating a digital signature by a node of the consortium blockchain network in accordance with implementations of the present specification.

FIG. 3 depicts an example of a process 300 of sending a signed message from a first node to a second node of a consortium blockchain network in accordance with implementations of the present specification.

For illustration purpose, assume in this example, the ECC algorithms used to sign the message is a set of SM2 algorithms that are based on an elliptic curve function according to equation:

$$y^2 = x^3 + ax + b \quad (1)$$

where a and b represent predefined parameters in finite field $F_q$ that define an elliptic curve E over $F_q$.

At 305, the sending node (hereinafter "a first node") creates a private-public key pair using a base point on the elliptic curve according to equation:

$$Q_A = d_A \times G \quad (2)$$

where $Q_A$ represents a public key associated with the first node; $d_A$ represents a private key associated with the first node and corresponds to $Q_A$; and G represents a base point on the elliptic curve E, with prime order.

In some implementations, each transaction is stored in a blockchain if it has a valid signature, and only valid keys can generate valid signatures. For example, if node A wants to request a payment from node B, node A needs to submit a signed request and its public key to node B. Node B will send node A the payment only if it confirms the signature is valid.

At 310, the first node calculates a selected curve point on the elliptic curve using a random number according to equation:

$$R = (x_R, y_R) = k \times G \quad (3)$$

where R represents a selected point on the elliptic curve, and where $x_R$, $y_R$ represent the x-axis and the y-axis value of R, respectively; k represents a random number in [1, n−1], where k is generated by a random number generator, and n represents a degree of the base point G.

At 315, the first node signs a data digest of a message using its private key, where the signature includes a left part value, a right part value, and a redundant information, each is determined according to equations:

$$r = (e + x_R)(\mod n) \quad (4)$$

$$s = (1 + d_A)^{-1}(k - rd_A)(\mod n) \quad (5)$$

$$recid = \begin{cases} 0, & \text{if } y_R(\mod 2) = 0 \\ 1, & \text{if } y_R(\mod 2) = 1 \end{cases} \quad (6)$$

where r represents a left part value of the SM2 signature; e represents a data digest, where e is a hash value of the message M that sent from an account associated with the first node; and s represents a right part value of the digital signature; recid represents the redundant information included in the digital signature.

In some implementations, the first node creates a data digest of the message using a hash function, and cryptographically signs the data digest using its private key.

In some cases, besides the left part value and the right value, the signature also includes redundant information which is based on the parity of the y-axis value of the selected curve point. Because the redundant information is unique to the signature and cannot be changed, it can be further used to determine the recovered public keys. At 320, the first node sends the signed message to a receiving node ("the second node").

Figure 4:
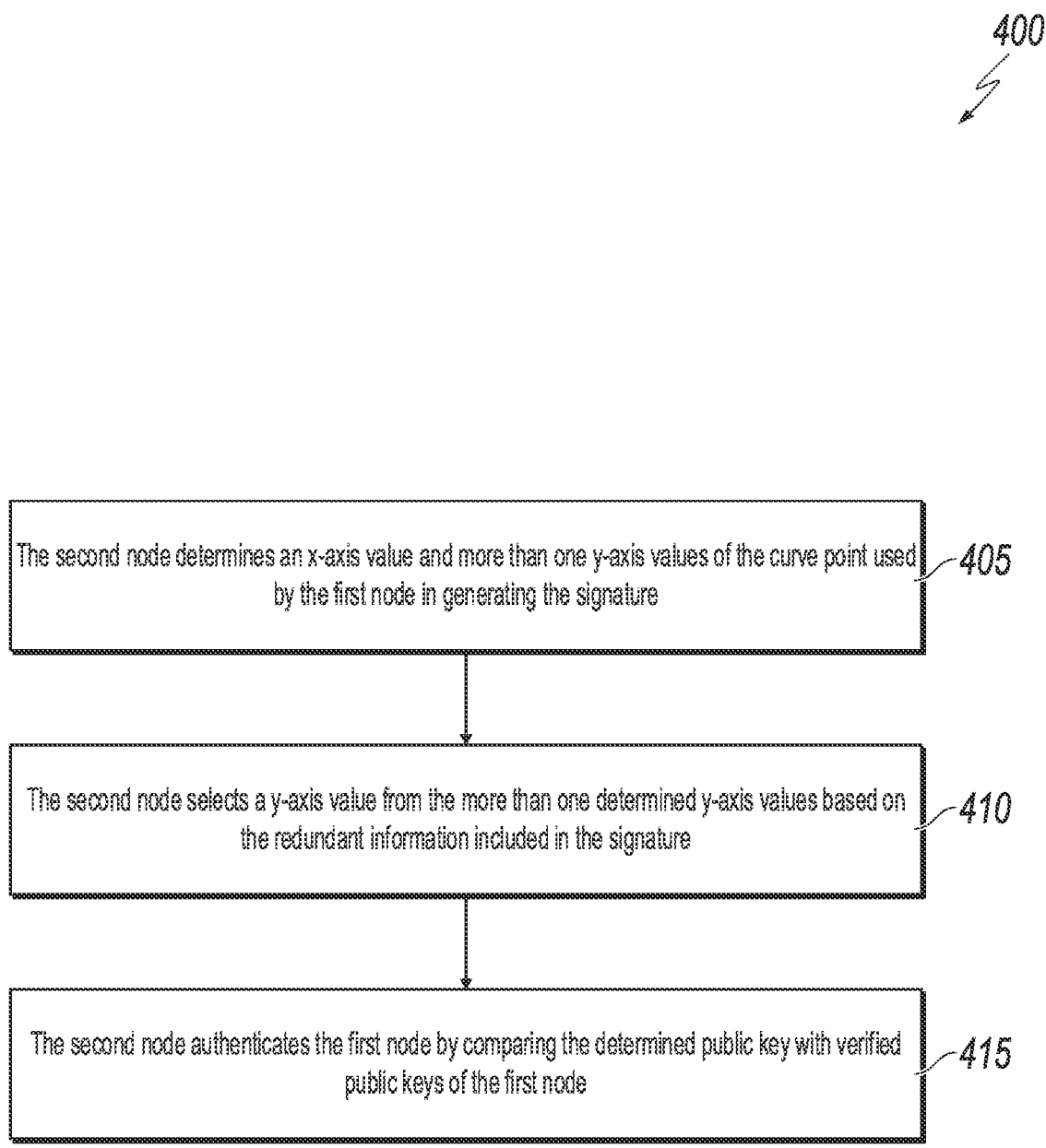
FIG. 4 depicts an example of a process of authenticating a node of the consortium blockchain network based on the digital signature sent from an account associated with the node in accordance with implementations of the present specification.

FIG. 4 depicts an example of a process 400 for authenticating a node of the consortium blockchain network based on a digital signature in accordance with implementations of the present specification.

At 405, the second node determines an x-axis value and more than one y-axis values of the curve point used by the first node in generating the signature, according to equations:

$$x_R = (r - e)(\mod n) \quad (7)$$

$$y_R = \pm \sqrt{x_R^3 + ax_R + b}(\mod p) \quad (8)$$

where $x_R$ represents an x-axis value of the selected point R, $y_R$ represents an y-axis value of the selected point R, p represents a prime number greater than 3.

In some cases, if the value of $x_R$ generated by the first node is greater than n, the value of $x_R$ is determined according to the following equation:

$$x_R = (r - e)(\mod n) + n \quad (8a)$$

In such a case, the first node adds the amount by which $x_R$ overflows to recid when it is generated.

At 410, the second node selects a y-axis value from the more than one determined y-axis values based on the redundant information included in the signature.

Because one of the y-axis values determined from step 405 is negative, and the other is positive, the values generated after a modulation operation for each of these two y-axis values have different parity. Only the y-axis value that has the same parity as the one in the redundant information can be confirmed as the correct y-axis value of the selected curve point.

At 415, the second node determines the public key of the first node based on the redundant information in the received signature, according to the equation:

$$Q_A' = (r+s)^{-1}(R - s*G) \qquad (9)$$

where $Q_A'$ represents the public key associated with the second account.

At 425, the second node authenticates the first node by comparing the determined public key with verified public keys of the first node.

Because in blockchain network, the public keys of a node is open to other nodes within the blockchain network, once the second node recovered the public key from the signature, it can compare the recovered public key with other public keys of the first node known to the blockchain network. If there is a match, the first node is authenticated. Otherwise, it indicates the signed message is not sent from node A.

Figure 5:
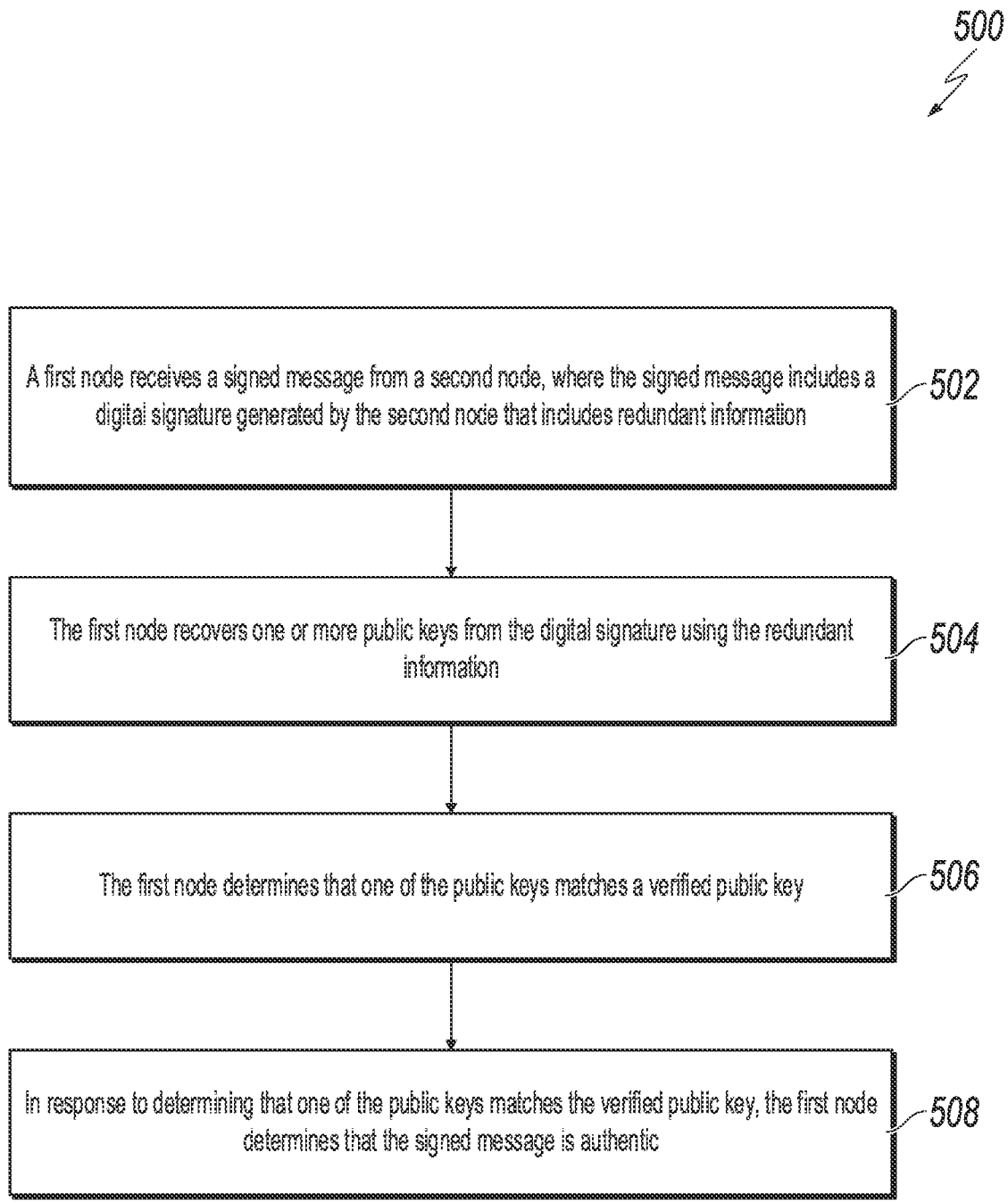
FIG. 5 depicts an example of a process that can be executed in accordance with embodiments of this specification.

FIG. 5 is a flowchart of an example of a process 500 for authenticating a blockchain node. For convenience, the process 500 will be described as being performed by a system of one or more computers, located in one or more locations, and programmed appropriately in accordance with this specification. For example, a computer-implemented system, e.g., the computer-implemented system 100 of FIG. 1, appropriately programmed, can perform the process 500.

At 502, a signed message is received by a first node and from a second node. In some implementations, the message can be signed by the second node using an encryption key associated with a user that is associated with the second node.

In some implementations, the signed message includes a digital signature generated by the second node. In some cases, the digital signature is generated based on redundant information. In some implementations, the first node and the second node belong to a blockchain network, such as a consortium blockchain network, and identity information associated with the second node is unknown to the first blockchain node.

At 504, in response to receiving the signed message, one or more public keys are recovered from the digital signature by the first node. In some cases, the public key is recovered based on the redundant information. In some implementations, the verified public key is associated with an authenticated node that is registered with the consortium blockchain network.

In some implementations, the digital signature is signed by using a private key associated with the second node based on a set of cryptographic algorithms, where the set of cryptographic algorithms are based on an elliptic curve according to equation (1), and where the private key is determined according to equation (2).

In some implementations, the digital signature includes a left part value, a right part value, and the redundant information, where the left part value is determined by using a selected point on the elliptic curve according to equations (3) and (4), the right part value is determined according to equation (5), and the redundant information is determined according to equation (6).

At 506, in response to recovering the public key, it is determined that one or the one or more public keys matches a verified public key by the first node.

In some implementations, recovering the public key from the digital signature includes determining the public key based on the parity of the redundant information included in the digital signature.

In some implementations, determining the public key based on the parity of the redundant information includes determining, an x-axis value of the selected point on the elliptic curve according to equation (7), determining, more than one y-axis values of the selected point on the elliptic curve according to on equation (8), selecting a y-axis value from the determined more than one y-axis values based on the redundant information; and determining a public key associated with the second account according to equation (9).

At 508, in response to determining that one of the one or more public keys matches the verified public key, it is determined that the signed message is authentic.

Figure 6:
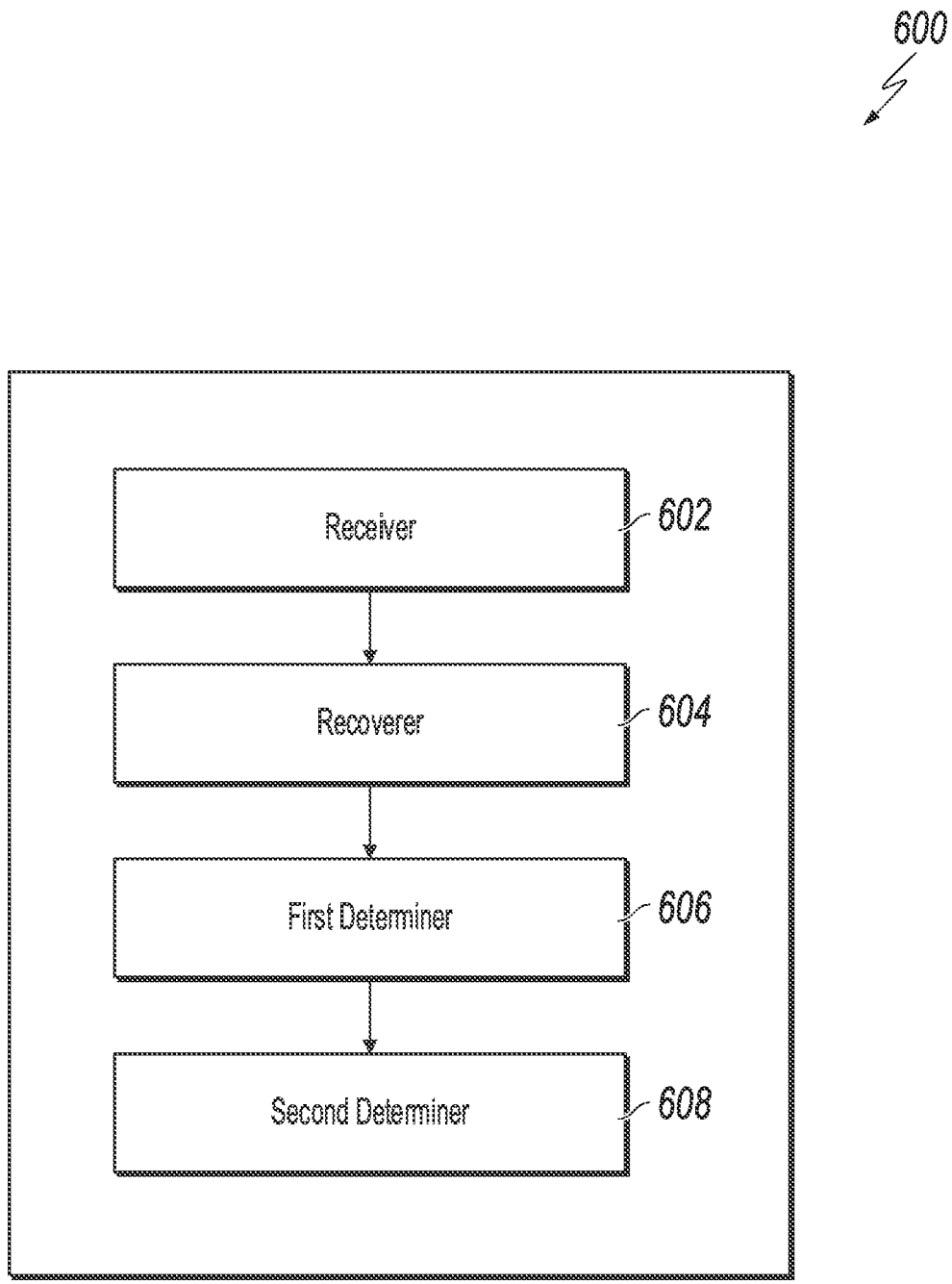
FIG. 6 depicts examples of modules of an apparatus in accordance with embodiments of this specification.

FIG. 6 is a diagram of on example of modules of an apparatus 600 in accordance with embodiments of this specification.

The apparatus 600 can be an example of an embodiment of a blockchain node configured to transmit data in a blockchain network, where the blockchain network is a consortium blockchain network. The apparatus 600 can correspond to the embodiments described above, and the apparatus 600 includes the following: a receiver or receiving unit 602 for receiving a signed message from a second blockchain node, wherein the signed message includes a digital signature generated by the second blockchain node that includes redundant information; a recoverer or recovering unit 604 for recovering a public key from the digital signature using the redundant information; a first determiner or a determining unit 606 for determining that the recovered public key matches a verified public key; and a second determiner or a determining unit 608 for determining that the signed message is authentic.

In an optional implementation, the first blockchain node and the second blockchain node belong to a consortium blockchain network, and wherein identity information associated with the second blockchain node is unknown to the first blockchain node.

In an optional implementation, the verified public key is associated with an authenticated blockchain node that is registered with the consortium blockchain network.

In an optional implementation, the digital signature is signed by using a private key associated with the second blockchain node based on a set of cryptographic algorithms, wherein the set of cryptographic algorithms are based on an elliptic curve according to equation (1), and wherein the private key is determined according to equation (2).

In an optional implementation, the digital signature includes a left part value, a right part value, and the redundant information, wherein the left part value is determined by using a selected point on the elliptic curve according to equations (3) and (4), the right part value is determined according to equation (5), and the redundant information is determined according to equation (6).

In an optional implementation, the recoverer or recovering unit 604 determines the public key based on the parity of the redundant information included in the digital signature.

In an optional implementations, the determiner or first determining unit 606 is used to determining the public key based on the parity of the redundant information includes determining, an x-axis value of the selected point on the elliptic curve according to equation (7), determining, more than one y-axis values of the selected point on the elliptic curve according to on equation (8), selecting a y-axis value from the determined more than one y-axis values based on the redundant information; and determining a public key associated with the second account according to equation (9).

The system, apparatus, module, or unit illustrated in the previous embodiments can be implemented by using a computer chip or an entity, or can be implemented by using a product having a certain function. A typical embodiment device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an embodiment process of functions and roles of each module in the apparatus, references can be made to an embodiment process of corresponding steps in the previous method. Details are omitted here for simplicity.

Because an apparatus embodiment basically corresponds to a method embodiment, for related parts, references can be made to related descriptions in the method embodiment. The previously described apparatus embodiment is merely an example. The modules described as separate parts may or may not be physically separate, and parts displayed as modules may or may not be physical modules, may be located in one position, or may be distributed on a number of network modules. Some or all of the modules can be selected based on actual demands to achieve the objectives of the solutions of the specification. A person of ordinary skill in the art can understand and implement the embodiments of the present application without creative efforts.

Referring again to FIG. 6, it can be interpreted as illustrating an internal functional module and a structure of an apparatus for authenticating a blockchain node. An execution body in essence can be an electronic device, and the electronic device includes the following: one or more processors; and a memory configured to store an executable instruction of the one or more processors.

The techniques described in this specification produce one or more technical effects. In some embodiments, more than one public key are recovered from a signature sent by a blockchain node, and the correct public key can be determined from the recovered public keys. In such embodiments, the receiving node can use the recovered correct key to authenticate the sending node, instead of trying each public key that associated with the sending node, reducing the processing time.

Described embodiments of the subject matter can include one or more features, alone or in combination.

For example, in a first embodiment, a computer-implemented method comprises receiving, by a first node, a signed message from a second node, wherein the signed message includes a digital signature generated by the second node; in response to receiving the signed message, recovering, by the first node, one or more public keys from the digital signature; in response to recovering the one or more public keys, determining, by the first node, that one of the one or more public keys matches a verified public key; and in response to determining that one of the one or more public keys matches the verified public key, determining that the signed message is authentic.

The foregoing and other described embodiments can each, optionally, include one or more of the following features:

A first feature, combinable with any of the following features, specifies that the first blockchain node and the second blockchain node belong to a consortium blockchain network, and wherein identity information associated with the second blockchain node is unknown to the first blockchain node.

A second feature, combinable with any of the previous or following features, specifies that the verified public key is associated with an authenticated blockchain node that is registered with the consortium blockchain network.

A third feature, combinable with any of the previous or following features, specifies that the digital signature is signed by using a private key associated with the second blockchain node based on a set of cryptographic algorithms, wherein the set of cryptographic algorithms are based on an elliptic curve according to equation (1), and wherein the private key is determined according to equation (2).

A fourth feature, combinable with any of the previous or following features, specifies that the digital signature includes a left part value, a right part value, and the redundant information, wherein the left part value is determined by using a selected point on the elliptic curve according to equations (3) and (4), the right part value is determined according to equation (5), and the redundant information is determined according to equation (6).

A fifth feature, combinable with any of the previous or following features, specifies that recovering the public key from the digital signature includes determining the public key based on the parity of the redundant information included in the digital signature.

A sixth feature, combinable with any of the previous or following features, specifies that determining the public key based on the parity of the redundant information includes determining, an x-axis value of the selected point on the elliptic curve according to equation (7), determining, more than one y-axis values of the selected point on the elliptic curve according to on equation (8), selecting a y-axis value from the determined more than one y-axis values based on the redundant information; and determining a public key associated with the second account according to equation (9).

A seventh feature, combinable with any of the previous or following features, specifies that the verified public key is associated with a user that is associated with the second node.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. For example, a computer program carrier can include one or more computer-readable storage media that have instructions encoded or stored thereon. The carrier may be a tangible non-transitory computer-readable medium, such as a magnetic, magneto optical, or optical disk, a solid state drive, a random access memory (RAM), a read-only memory (ROM), or other types of media. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

Processors for execution of a computer program include, by way of example, both general- and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific embodiment details, these should not be construed as limitations on the scope of what is being claimed, which is defined by the claims themselves, but rather as descriptions of features that may be specific to particular embodiments. Certain features that are described in this specification in the context of separate embodiments can also be realized in combination in a single embodiment. Conversely, various features that are described in the context of a single embodiments can also be realized in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for authentication, comprising:
   receiving, by a first node, a signed message from a second node, wherein the signed message includes redundant information in a digital signature generated by the second node;
   in response to receiving the signed message, recovering, by the first node using the redundant information, one or more public keys from the digital signature;
   in response to recovering the one or more public keys, determining, by the first node, that one of the one or more public keys matches a verified public key; and
   in response to determining that one of the one or more public keys matches the verified public key, determining that the signed message is authentic.

2. The computer-implemented method of claim 1, wherein the verified public key is associated with a user that is associated with the second node.

3. The computer-implemented method of claim 1, wherein the first node and the second node belong to a blockchain network, and wherein identity information associated with the second node is unknown to the first node.

4. The computer-implemented method of claim 1, wherein the verified public key is associated with an authenticated node that is registered with a consortium blockchain network.

5. The computer-implemented method of claim 1, wherein the digital signature is signed by using a private key associated with the second node based on a set of cryptographic algorithms, wherein the set of cryptographic algorithms are based on an elliptic curve according to equation:

$$y^2 = x^3 + ax + b$$

wherein:
a and b represent predefined parameters in a finite field $F_q$ that define an elliptic curve E over $F_q$; and
the private key is determined according to equation:

$$Q_A = d_A \times G$$

wherein:
$Q_A$ is the public key;
$d_A$ represents the private key associated with the second node and corresponds to e; and
G represents a base point on the elliptic curve E, with prime order.

6. The computer-implemented method of claim 5, wherein the digital signature includes a left part value, a right part value, and the redundant information, wherein the left part value is determined by using a selected point on the elliptic curve according to equations:

$$R = (x_B, y_B) = k \times G$$

$$r = (e + x_2)(\bmod n)$$

wherein:
R represents a selected point on the elliptic curve, and where $x_B, y_A$ represent the x-axis and the y-axis value of R, respectively;
k represents a random number in [1, n−1], and n represents a degree of the base point G;
r represents a left part value of the digital signature; and
e represents a hash value of a message M that is sent from a second account to a first account;
and the right part value is determined according to equation:

$$s = (1 + d_A)^{-1}(k - rd_A)(\bmod n)$$

wherein:
s represents a right part value of the digital signature; and
the redundant information is determined according to equation:

$$recid = \begin{cases} 0, & \text{if } y_R(\bmod 2) = 0 \\ 1, & \text{if } y_R(\bmod 2) = 1 \end{cases}$$

wherein recid represents the redundant information included in the digital signature.

7. The computer-implemented method of claim 6, wherein recovering the public key from the digital signature includes determining the public key based on a parity of the redundant information included in the digital signature.

8. The computer-implemented method of claim 7, wherein determining the public key based on the parity of the redundant information includes:
determining an x-axis value of the selected point on the elliptic curve according to equation: $x_R = (r - e)(\bmod n)$
wherein:
$x_R$ represents an x-axis value of the selected point R;
determining more than one y-axis values of the selected point on the elliptic curve according to on equation:

$$y_R = \sqrt{x_R^2 + ax_R + b} (\bmod p)$$

wherein:
$y_R$ represents an y-axis value of the selected point R;
p represents a prime number greater than 3;
selecting a y-axis value from the determined more than one y-axis values based on the redundant information; and
determining a public key associated with the second account according to equation:

$$Q_A' = (r + s)^{-1}(R - s \times G)$$

wherein:
$Q_A'$ represents the public key associated with the second account.

9. A non-transitory, computer-readable storage medium storing one or more instructions executable by a computer system to perform operations comprising:
receiving, by a first node, a signed message from a second node, wherein the signed message includes redundant information in a digital signature generated by the second node;

in response to receiving the signed message, recovering, by the first node using the redundant information, one or more public keys from the digital signature;

in response to recovering the one or more public keys, determining, by the first node, that one of the one or more public keys matches a verified public key; and in response to determining that one of the one or more public keys matches the verified public key, determining that the signed message is authentic.

10. The non-transitory, computer-readable storage medium of claim 9, wherein the verified public key is associated with a user that is associated with the second node.

11. The non-transitory, computer-readable storage medium of claim 9, wherein the first node and the second node belong to a blockchain network, and wherein identity information associated with the second node is unknown to the first node.

12. The non-transitory, computer-readable storage medium of claim 9, wherein the verified public key is associated with an authenticated node that is registered with a consortium blockchain network.

13. The non-transitory, computer-readable storage medium of claim 9, wherein the digital signature is signed by using a private key associated with the second node based on a set of cryptographic algorithms, wherein the set of cryptographic algorithms are based on an elliptic curve according to equation:

$$y^2 = x^3 + ax + b$$

wherein:
a and b represent predefined parameters in a finite field $F_q$ that define an elliptic curve E over $F_q$; and
the private key is determined according to equation:

$$Q_A = d_A \times G$$

wherein:
$Q_A$ is the public key;
$d_A$ represents the private key associated with the second node and corresponds to $Q_A$; and
G represents a base point on the elliptic curve E, with prime order.

14. The non-transitory, computer-readable storage medium of claim 13, wherein the digital signature includes a left part value, a right part value, and the redundant information, wherein the left part value is determined by using a selected point on the elliptic curve according to equations:

$$R = (x_R, y_R) = k \times G$$

$$r = (e + x_2)(\mod n)$$

wherein:
R represents a selected point on the elliptic curve, and where $x_R, y_R$ represent the x-axis and the y-axis value of R, respectively;
k represents a random number in [1, n−1], and n represents a degree of the base point G;
r represents a left part value of the digital signature; and
e represents a hash value of a message M that is sent from a second account to a first account;
and the right part value is determined according to equation:

$$s = (1 + d_A)^{-1}(k - rd_A)(\mod n)$$

wherein:
s represents a right part value of the digital signature; and the redundant information is determined according to equation:

$$recid = \begin{cases} 0, & \text{if } y_R(\mod 2) = 0 \\ 1, & \text{if } y_R(\mod 2) = 1 \end{cases}$$

wherein recid represents the redundant information included in the digital signature.

15. The non-transitory, computer-readable storage medium of claim 14, wherein recovering the public key from the digital signature includes determining the public key based on a parity of the redundant information included in the digital signature.

16. The non-transitory, computer-readable storage medium of claim 15, wherein determining the public key based on the parity of the redundant information includes:
determining an x-axis value of the selected point on the elliptic curve according to equation:

$$x_R = (r - e)(\mod n)$$

wherein:
$x^R$ represents an x-axis value of the selected point R;
determining more than one y-axis values of the selected point on the elliptic curve according to on equation:

$$y_R = \pm\sqrt{x_R^3 + ax_R + b}(\mod p)$$

wherein:
$y_R$ represents an y-axis value of the selected point R;
p represents a prime number greater than 3;
selecting a y-axis value from the determined more than one y-axis values based on the redundant information; and
determining a public key associated with the second account according to equation:

$$Q_A' = (r + s)^{-1}(R - s \times G)$$

wherein:
$Q_A'$ represents the public key associated with the second account.

17. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving, by a first node, a signed message from a second node, wherein the signed message includes redundant information in a digital signature generated by the second node,
in response to receiving the signed message, recovering, by the first node using the redundant information, one or more public keys from the digital signature,
in response to recovering the one or more public keys, determining, by the first node, that one of the one or more public keys matches a verified public key, and
in response to determining that one of the one or more public keys matches the verified public key, determining that the signed message is authentic.

18. The system of claim 17, wherein the verified public key is associated with a user that is associated with the second node.

19. The system of claim 17, wherein the first node and the second node belong to a blockchain network, and wherein identity information associated with the second node is unknown to the first node.

20. The system of claim 17, wherein the verified public key is associated with an authenticated node that is registered with a consortium blockchain network.

21. The system of claim 17, wherein the digital signature is signed by using a private key associated with the second node based on a set of cryptographic algorithms, wherein the set of cryptographic algorithms are based on an elliptic curve according to equation:

$$y^2 = x^3 + ax + b$$

wherein:
a and b represent predefined parameters in a finite field $F_q$ that define an elliptic curve E over $F_q$; and
the private key is determined according to equation:

$$Q_A = d_A \times G$$

wherein:
$Q_A$ is the public key;
$d_A$ represents the private key associated with the second node and corresponds to $Q_A$; and
G represents a base point on the elliptic curve E, with prime order.

22. The system of claim 21, wherein the digital signature includes a left part value, a right part value, and the redundant information, wherein the left part value is determined by using a selected point on the elliptic curve according to equations:

$$R = (x_R, y_R) = k \times G$$

$$r = (e + x_2)(\bmod n)$$

wherein:
R represents a selected point on the elliptic curve, and where $x_R, y_R$ represent the x-axis and the y-axis value of R, respectively;
k represents a random number in [1, n−1], and n represents a degree of the base point G;
r represents a left part value of the digital signature; and
e represents a hash value of a message M that is sent from a second account to a first account;
and the right part value is determined according to equation:

$$s = (1 + d_A)^{-1}(k - r d_A)(\bmod n)$$

wherein:
s represents a right part value of the digital signature; and
the redundant information is determined according to equation:

$$recid = \begin{cases} 0, & \text{if } y_R(\bmod 2) = 0 \\ 1, & \text{if } y_R(\bmod 2) = 1 \end{cases}$$

wherein recid represents the redundant information included in the digital signature.

23. The system of claim 22, wherein recovering the public key from the digital signature includes determining the public key based on a parity of the redundant information included in the digital signature.

24. The system of claim 23, wherein determining the public key based on the parity of the redundant information includes:
determining an x-axis value of the selected point on the elliptic curve according to equation:

$$x_R = (r - e)(\bmod n)$$

wherein:
$x_R$ represents an x-axis value of the selected point R;
determining more than one y-axis values of the selected point on the elliptic curve according to on equation:

$$y_R = \pm\sqrt{x_R^3 + ax_a + b}(\bmod p)$$

wherein:
$y_R$ represents an y-axis value of the selected point R;
p represents a prime number greater than 3;
selecting a y-axis value from the determined more than one y-axis values based on the redundant information; and
determining a public key associated with the second account according to equation:

$$Q_A' = (r + s)^{-1}(R - s \times G)$$

wherein:
$Q_A'$ represents the public key associated with the second account.

* * * * *

UNITED STATES PATENT AND TRADEMARK OFFICE
CERTIFICATE OF CORRECTION

PATENT NO. : 10,659,233 B1  Page 1 of 1
APPLICATION NO. : 16/587494
DATED : May 19, 2020
INVENTOR(S) : Zhiyuan Zhou It is certified that error appears in the above-identified patent and that said Letters Patent is hereby corrected as shown below:

In the Claims

In Claim 5, Column 15, Line 65, delete "e;" and insert -- $Q_A$; --, therefor.

In Claim 6, Column 16, Line 6, delete "R=($x_B$,$y_B$)=kxG" and insert -- R=($x_R$,$y_R$)=kxG --, therefor.

In Claim 6, Column 16, Line 7, delete "r=(e+$x_2$)(mod n)" and insert -- r=(e+$x_R$)(mod n) --, therefor.

In Claim 6, Column 16, Line 11, delete "$x_B$,$y_A$" and insert -- $x_R$,$y_R$ --, therefor.

In Claim 8, Column 16, Line 47, delete "$y_R = \sqrt{x_R^3 + ax_R + b}$ (mod p)" and insert -- $y_R = \pm\sqrt{x_R^3 + ax_R + b}$ (mod p) --, therefor.

In Claim 14, Column 17, Line 52, delete "r=(e+$x_2$)(mod n)" and insert -- r=(e+$x_R$)(mod n) --, therefor.

In Claim 16, Column 18, Line 25, delete "$x^R$" and insert -- $x_R$ --, therefor.

In Claim 22, Column 19, Line 34, delete "r=(e+$x_2$)(mod n)" and insert -- r=(e+$x_R$)(mod n) --, therefor.

In Claim 24, Column 20, Line 30, delete "$y_R = \pm\sqrt{x_R^3 + ax_a + b}$ (mod p) (mod p)" and insert -- $y_R = \pm\sqrt{x_R^3 + ax_R + b}$ (mod p) --, therefor.

Signed and Sealed this
Twentieth Day of October, 2020

Andrei Iancu
*Director of the United States Patent and Trademark Office*